US008765318B2

(12) United States Patent
Quattrociocchi et al.

(10) Patent No.: US 8,765,318 B2
(45) Date of Patent: Jul. 1, 2014

(54) SYSTEM AND METHOD FOR ELECTROCHEMICAL CELL SYSTEM AND LEAK DETECTION AND INDICATION

(75) Inventors: Sonia Quattrociocchi, Mississauga (CA); Rami Michel Abouatallah, Vaughan (CA); Todd Arnold Simpson, Dunnville (CA)

(73) Assignee: Hydrogenics Corporation, Mississauga (CA)

( * ) Notice: Subject to any disclaimer, the term of this patent is extended or adjusted under 35 U.S.C. 154(b) by 1085 days.

(21) Appl. No.: 12/446,858

(22) PCT Filed: Oct. 23, 2007

(86) PCT No.: PCT/CA2007/001881
§ 371 (c)(1),
(2), (4) Date: Oct. 15, 2010

(87) PCT Pub. No.: WO2008/049210
PCT Pub. Date: May 2, 2008

(65) Prior Publication Data
US 2011/0097635 A1    Apr. 28, 2011

Related U.S. Application Data

(60) Provisional application No. 60/862,559, filed on Oct. 23, 2006.

(51) Int. Cl.
*H01M 8/04* (2006.01)
*H04L 29/06* (2006.01)

(52) U.S. Cl.
CPC ........ *H01M 8/0438* (2013.01); *H01M 8/04753* (2013.01); *H01M 8/04089* (2013.01); *H01M 8/04223* (2013.01); *H01M 8/04231* (2013.01); *H04L 69/18* (2013.01); *Y02E 60/50* (2013.01)

USPC ........... 429/443; 429/408; 429/427; 429/428; 429/429; 429/430; 429/431; 429/432; 429/444; 429/446

(58) Field of Classification Search
CPC .......... H01M 8/0438; H01M 8/04089; H01M 8/04753; H01M 8/04223; H01M 8/04039; H01M 8/04231; Y02E 60/50; H04L 69/18
USPC .......... 429/408, 427–432, 443, 444, 446–449
See application file for complete search history.

(56) References Cited

U.S. PATENT DOCUMENTS 4,953,396 A    9/1990  Langsdorf et al.
6,875,535 B2   4/2005  Ye et al.
(Continued)

FOREIGN PATENT DOCUMENTS

WO    2008/049210 A1    5/2008

OTHER PUBLICATIONS

International Search Report issued on Jan. 24, 2008 in respect to corresponding International Publication No. WO 2008/049210.

*Primary Examiner* — Patrick Ryan
*Assistant Examiner* — Ben Lewis
(74) *Attorney, Agent, or Firm* — Scott Pundsack; Borden Ladner Gervais, LLP

(57) ABSTRACT

An electrochemical cell system is provided having: at least one electrochemical cell stack, each stack having at least one reactant fluid inlet; a pressure transmitter arranged in the at least one reactant fluid inlet of each stack; and a control unit for regulating the electrochemical cell system, the control unit receiving at least one signal value from the pressure transmitter indicative of the reactant fluid pressure. The control unit may compare the at least one signal value with a stored values and generate a leak indication based on the rate of pressure decay within the electrochemical cell system. A method of detecting and indicating a leak is also disclosed.

12 Claims, 4 Drawing Sheets

(56) References Cited

U.S. PATENT DOCUMENTS

| | | |
|---|---|---|
| 7,018,732 B2 | 3/2006 | Cargnelli et al. |
| 7,127,937 B1 * | 10/2006 | Thyroff .................... 73/40.5 R |
| 7,425,379 B2 | 9/2008 | Joos |
| 2003/0077495 A1 | 4/2003 | Scartozzi et al. |
| 2004/0112118 A1 | 6/2004 | Puri et al. |
| 2005/0026022 A1 | 2/2005 | Joos |
| 2006/0210850 A1 * | 9/2006 | Abouatallah et al. ........... 429/22 |

* cited by examiner

SYSTEM AND METHOD FOR ELECTROCHEMICAL CELL SYSTEM AND LEAK DETECTION AND INDICATION

PRIORITY

This application claims the benefit of U.S. Provisional Patent Application No. 60/862,559, filed Oct. 23, 2006.

FIELD

This invention relates to an electrochemical cell system, and more particularly relates to an apparatus and a method of detecting and indicating leaks of the cell stack.

BACKGROUND

The following paragraphs are not an admission that anything discussed in them is prior art or part of the knowledge of persons skilled in the art.

Electrochemical cells are energy conversion devices and usually are used to collectively indicate fuel cells and electrolyzer cells.

Fuel cells have been proposed as a clean, efficient and environmentally friendly source of power that can be utilized for various applications. A conventional proton exchange membrane (PEM) fuel cell is typically comprised of an anode, a cathode, and a selective electrolytic membrane disposed between the two electrodes. A fuel cell generates electricity by bringing a fuel gas (typically hydrogen) and an oxidant gas (typically oxygen) respectively to the anode and the cathode. In reaction, a fuel such as hydrogen is oxidized at the anode to form cations (protons) and electrons by the reaction $H_2 = 2H^+ + 2e-$. The proton exchange membrane facilitates the migration of protons from the anode to the cathode while preventing the electrons from passing through the membrane. As a result, the electrons are forced to flow through an external circuit thus providing an electrical current. At the cathode, oxygen reacts with electrons returned from the electrical circuit and with the protons that have crossed the membrane to form liquid water as the reaction by-product following $½O_2 + 2H^+ + 2e- = H_2O$.

On the other hand, an electrolyzer uses electricity to electrolyze water to generate oxygen from its anode and hydrogen from its cathode. Similar to a fuel cell, a typical solid polymer water electrolyzer (SPWE) or proton exchange membrane (PEM) electrolyzer is also comprised of an anode, a cathode and a proton exchange membrane disposed between the two electrodes. Water is introduced to, for example, the anode of the electrolyzer, which is connected to the positive pole of a suitable direct current voltage. Oxygen is produced at the anode by the reaction $H_2O = ½O_2 + 2H^+ + 2e-$. The protons then migrate from the anode to the cathode through the membrane. On the cathode, which is connected to the negative pole of the direct current voltage, the protons conducted through the membrane are reduced to hydrogen following $2H^+ + 2e- = H_2$.

A typical electrochemical cell employing PEM comprises an anode flow field plate, a cathode flow field plate, and a membrane electrode assembly (MEA) disposed between the anode and cathode flow field plates. Each reactant flow field plate has an inlet region, an outlet region, and open-faced channels to fluidly connect the inlet to the outlet, and provide a way for distributing the reactant gases to the outer surfaces of the MEA. The MEA comprises a PEM disposed between an anode catalyst layer and a cathode catalyst layer. A first gas diffusion layer (GDL) is disposed between the anode catalyst layer and the anode flow field plate, and a second GDL is disposed between the cathode catalyst layer and the cathode flow field plate. The GDLs facilitate the diffusion of the reactant gas, either the fuel or oxidant, to the catalyst surfaces of the MEA. Furthermore, the GDLs enhance the electrical conductivity between each of the anode and cathode flow field plates and the electrodes.

In practice, fuel cells are not operated as single units. Rather fuel cells are connected in series, stacked one on top of the other, or placed side-by-side, to form what is usually referred to as a fuel cell stack. The fuel, oxidant and coolant are supplied through respective delivery subsystems to the fuel cell stack. Also within the stack are current collectors, cell-to-cell seals and insulation, with required piping and instrumentation provided externally to the fuel cell stack. Fuel cross-over from the anode side of the fuel cell to the cathode side, or from the cathode side to the anode side, may occur when the seals between cell components are inadequate or when the membrane of the MEA is ruptured. This typically develops as the stack ages. There is generally a small cross-over of hydrogen or oxygen occurring naturally across the MEA (driven by concentration gradients). The net diffusion due to the concentration gradient will be from either anode to cathode or cathode to anode depending on which electrode is at the higher pressure. The presence of fuel on the oxidant side of the fuel cell, or oxygen on the fuel side of the fuel cell, is highly undesirable because of the direct combustion reaction that may take place. The heat generated during this reaction may cause damage to the membrane and/or other parts of the fuel cell. Un-combusted fuel will follow the cathode exhaust stream and mix with the oxygen therein. This is undesirable because of the risk for such a mixture to ignite (4 percent of hydrogen per volume in air is hydrogen's lower flammability limit). In addition, the hydrogen/fuel side of the stack may develop external leaks over time. These need to be avoided or designed into the system so that flammable mixtures are not created in the fuel cell environment. Furthermore, the fuel cell can leak internally due to faulty seals or separator plates, e.g., leakage from reactant fluid to coolant or vice versa.

Fuel cell stacks have been used as power sources in various applications, such as fuel cell powered electric vehicles, residential power generator, auxiliary power unit, uninterrupted power source, etc. For fuel cell stacks to be used in power generation applications, many peripheral devices, conditioning devices are needed since fuel cell stacks rely on peripheral preconditioning devices for optimum or even proper operation. Extensive piping and plumbing work is also required for connection between such devices.

For example, in the situation where the fuel gas of the fuel cell stack is not pure hydrogen, but rather hydrogen containing material, e.g., natural gas, a reformer is usually required in the fuel delivery subsystem for reforming the hydrogen containing material to provide pure hydrogen to the fuel cell stack. Moreover, in the situation where the electrolyte of the fuel cell is a proton exchange membrane, since most of the membranes currently available requires a wet surface to facilitate the conduction of protons from the anode to the cathode, and otherwise to maintain the membranes electrically conductive, a humidifier is usually required to humidify the fuel or oxidant gas before it comes into the fuel cell stack. In addition, most conventional fuel cell systems utilize several heat exchangers in gas and coolant delivery subsystems to dissipate the heat generated in the fuel cell reaction, provide coolant to the fuel cell stack, and heat or cool the process gases. In some applications, the process gases or coolant may need to be pressurized before entering the fuel cell stack, and, therefore, compressors and pumps may be added to the delivery subsystems.

These peripheral devices as well as the fuel cell stacks are often packaged together as a power module (fuel cell power module, FCPM), which will often be disposed in a confined environment, where space is limited, such as vehicular applications or other portable applications. Control and regulation of the FCPM is typically performed by an electronic control unit (ECU), which forms an integral part of the FCPM.

Therefore, there is a need for an electrochemical cell system that provides an indication of leaks in the cell stack or out from the cell stack to an operator of the system.

SUMMARY

The following introduction is intended to introduce the reader to this specification but not to define any invention. One or more inventions may reside in a combination or sub-combination of the apparatus elements or method steps described below or in other parts of this document. The inventor does not waive or disclaim his rights to any invention or inventions disclosed in this specification merely by not describing such other invention or inventions in the claims.

In accordance with an aspect of the present invention, there is provided an electrochemical cell system comprising: (a) at least one electrochemical cell stack, each stack having a reactant fluid inlet; (b) a pressure transmitter arranged in the reactant fluid inlet of each stack; and (c) a control unit for regulating the electrochemical cell system, the control unit receiving a signal value from the pressure transmitter indicative of the reactant fluid pressure and comparing the signal value with a stored value. The control unit may generate a leak indication signal if the signal value lower than the stored value. The signal value and the stored value may correspond with pressure in the at least one electrochemical cell stack at a pre-set time period after initiating shut-down of the electrochemical cell system.

In accordance with a further aspect of the present invention, there is provided an electrochemical cell system comprising at least one electrochemical cell stack, each stack having a reactant fluid inlet, a pressure transmitter arranged in the reactant fluid inlet of each stack, and a control unit for regulating the electrochemical cell system, the control unit: (i) receiving a plurality of signal values from the pressure transmitter indicative of the reactant fluid pressure; (ii) recording a time for the signal values to reach a pre-set pressure point; (iii) comparing the time to a pre-set threshold time; and (iv) generating a leak indication signal if the time is less than the pre-set threshold time.

In accordance with a further aspect of the present invention, there is provided a method of operating an electrochemical cell system, the electrochemical cell system having at least one electrochemical cell stack and each stack having a reactant fluid inlet, the method comprising: (a) sensing a reactant fluid pressure in the reactant fluid inlet; (b) recording the reactant fluid pressure at a pre-set time period from initiating shut-down of the electrochemical cell system; (c) comparing the reactant fluid pressure at the pre-set time period with a stored pressure; and (d) indicating a leak if the reactant fluid pressure is lower than the stored pressure.

The method may further comprise: (a) comparing the reactant fluid pressure with a stored maximum pressure; and (b) indicating a pressure alarm signal if the reactant fluid pressure is higher than the stored maximum pressure.

In accordance with a yet further aspect of the present invention, there is provided a method of operating an electrochemical cell system, the electrochemical cell system having at least one electrochemical cell stack and each stack having a reactant fluid inlet, the method comprising: (a) sensing a reactant fluid pressure in the reactant fluid inlet; (b) monitoring the reactant fluid pressure while initiating shut-down of the electrochemical cell system; (c) recording a time for the reactant fluid pressure to reach a pre-set pressure point; (d) comparing the time with a pre-set threshold time period; and (e) indicating a leak if the time is less than a pre-set threshold time period.

BRIEF DESCRIPTION OF THE DRAWINGS

For a better understanding of the present invention and to show more clearly how it may be carried into effect, reference will now be made, by way of example, to the accompanying drawings which show, by way of example, one or more embodiments of the present invention and in which.

DETAILED DESCRIPTION

Various apparatuses or methods will be described below to provide an example of an embodiment of each claimed invention. No embodiment described below limits any claimed invention and any claimed invention may cover apparatuses or methods that are not described below. The claimed inventions are not limited to apparatuses or methods having all of the features of any one apparatus or method described below or to features common to multiple or all of the apparatuses described below. It is possible that an apparatus or method described below is not an embodiment of any claimed invention. The applicants, inventors and owners reserve all rights in any invention disclosed in an apparatus or method described below that is not claimed in this document and do not abandon, disclaim or dedicate to the public any such invention by its disclosure in this document.

Process fluid leaks in an electrochemical cell may still allow the cell stack to operate if the leaks are distributed across numerous cells. The user would possibly not notice any degradation in power output in this case. If the leaks are confined to one or a few cells, the stack will typically have difficulty running at certain current densities and may cause a shut-down due to low cell voltage.

The present invention provides an apparatus and a method for providing detection and indication of a leak in an electrochemical cell system by monitoring the fuel fluid pressure in the anode inlet immediately after and for a specific time after a shutdown of the system. The shutdown may be a controlled shutdown or a shutdown generated by an emergency stop situation (e-stop). A controlled shutdown takes place when an electrochemical cell system is controlled to shut down normally and as a consequence of the desired operating cycle without there being abnormal conditions detected in the system to cause the shutdown. An e-stop shutdown, conversely, takes place after abnormal conditions are detected. In any case, as long as the ECU of the system has power enabling it to perform leak detection, the leak test according to the invention may be performed.

Figure 1A:
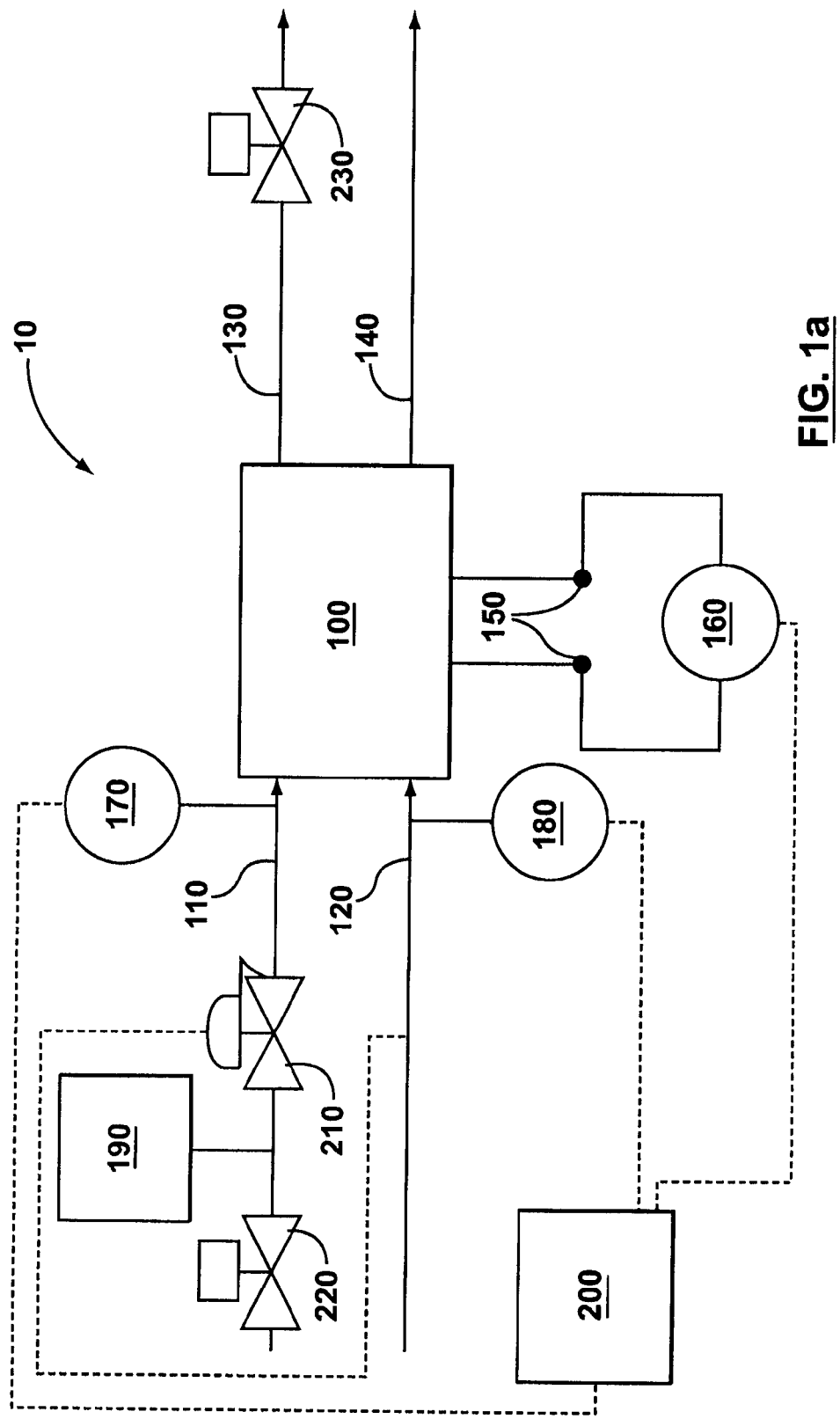
FIG. 1a is a schematic view illustrating an electrochemical cell system according to an embodiment of the present invention.

FIG. 1a shows a fuel cell system 10 (which may be a fuel cell power module, FCPM) having a fuel cell stack 100.

It is to be appreciated that the fuel cell system according to the present invention can be of any configuration, there may be one or more fuel cell stacks and each fuel cell stack can comprise any number and type of fuel cells, such as Proton Exchange Membrane (PEM) fuel cells, solid oxide fuel cells, alkaline fuel cells, etc. Examples of fuel cell system were disclosed U.S. Pat. Nos. 7,018,732 and 6,875,535, herein incorporated in whole by reference.

The fuel cell stack 100 has an anode inlet 110, for fuel fluid, and a cathode inlet 120, for oxidant. An anode outlet 130 expels depleted fuel and a cathode outlet 140 expels superfluous oxidant.

It is not shown in the figures, but recirculation may be employed for either the anode outlet (anode exhaust) and/or the cathode outlet (cathode exhaust). Typically, recirculation is employed to circulate fuel from the anode outlet to the anode inlet. Where recirculation is provided, it is common to provide a purge valve for controlled and periodic purging of a recirculation loop, for a variety of reason, e.g., to prevent build up of contaminants in the recirculation gas. Further, the reactants (fuel and oxidant) may be humidified before entering the fuel cell stack, depending on the membrane material, and this is not shown in the figures either.

The fuel cell stack 100 has an electric output 150 connected to a load (not shown) and the voltage of the output is measured using a voltage sensor 160. Current drawn by the load and other characteristics can also be monitored.

A pressure transmitter 170 is arranged at the anode input 110 to measure the fuel fluid pressure at the anode input 110. The pressure transmitter 170 can be any suitable device or devices capable of monitoring pressure, and need not necessarily measure pressure constantly with time. For example, a switch may be employed as the pressure transmitter 170.

Similarly, a pressure transmitter 180 can be arranged at the cathode input 120 to measure the oxidant fluid pressure at the cathode input 120.

A control unit 200 (or electronic control unit, ECU) is arranged to receive the signal indicative of the fuel fluid pressure from the pressure transmitter 170 (or the oxidant fluid pressure from the pressure transmitter 180). The voltage sensor 160 communicates the voltage signal to the control unit 200.

Hydrogenics Corporation, assignee of the present invention, typically employs a FCPM system where the anode inlet pressure is biased from the cathode inlet pressure. This may be achieved by utilizing a forward pressure regulator 210 (FPR) or similar device. The FPR controls the anode inlet pressure via a dome loading mechanism connected to the cathode inlet. For the cathode, in this embodiment, air is supplied by a blower as the oxidant, so that, at the cathode inlet to the stack 100, the pressure would be slightly in excess of atmospheric pressure. It will be understood that various oxidant sources can be used, e.g., pure oxygen can be used, and pressures higher or lower than atmospheric pressure can be maintained. The leak detection and indication arrangement according to the present invention is not limited to a pressure biased system, however, as there could be no bias at all. Further, a fuel inlet valve 220 (e.g., a hydrogen supply solenoid valve) and a fuel exhaust valve 230 (e.g., a hydrogen purge solenoid valve) may be utilized in the system to close fluid communication of fuel to and from the stack. The fuel inlet valve and the fuel exhaust valve are advantageously of the normally closed type.

At shut down, the fuel inlet and outlet valves 220, 230 are closed. The cathode side of the stack 100, in this embodiment, remains open to atmospheric pressure. A fuel reservoir 190 can be provided to enable passive blanketing of the electrodes, as disclosed in U.S. patent application Ser. No. 10/875,288, herein incorporated in whole by reference.

Figure 1B:
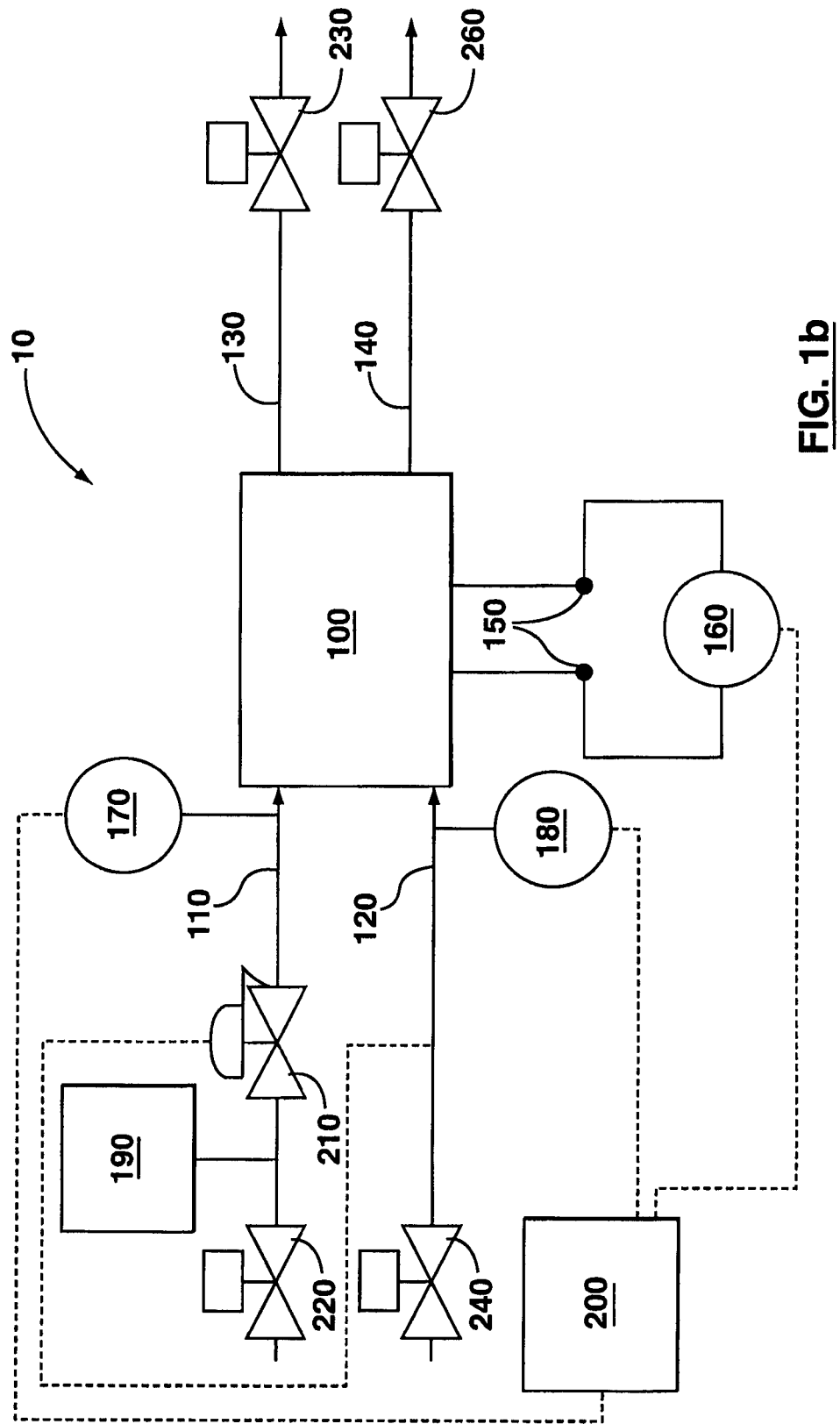
FIG. 1b is a schematic view illustrating an electrochemical cell system according to another embodiment of the present invention.

FIG. 1b shows another embodiment of a fuel cell system 10, with the same reference numbers used as for FIG. 1a to describe corresponding features. In this case, both the cathode inlet 120 and the cathode outlet 140 can be closed by oxidant inlet valve 240 and oxidant exhaust valve 260, respectively.

It should be understood that fuel reservoir 190 is optional and need not take the form of a separate tank(s) or vessels: the function of a reservoir can be provided by piping alone, depending on the amount of fuel necessary to passively blanket electrodes of the stack 100.

Referring to FIGS. 1a and 1b, all devices located between the valves 220 and 230 can be included in the leak test. For instance, heat exchangers or similar devices and valves of different types, including the valves 220 and 230 themselves.

Figure 2A:
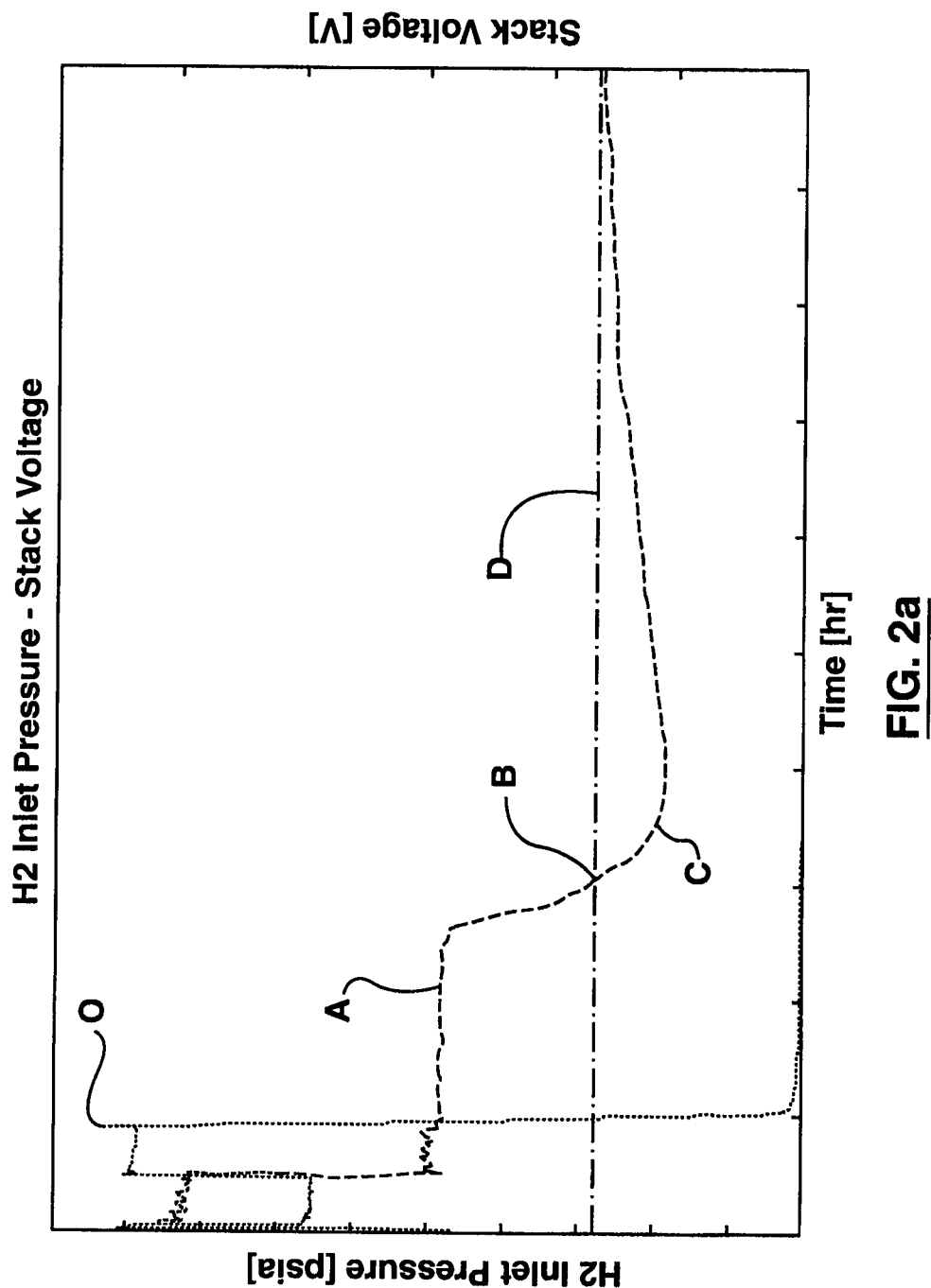
FIG. 2a is a diagram illustrating the shut-down behavior of an electrochemical cell system showing no stack leak.

FIG. 2a shows a diagram of the behavior of a cell stack according to the embodiment shown in FIG. 1a without any detectable leaks. The stack is shut down from a normal operation state at time zero (point O) but the cells continue to produce electricity for a short period because of residual fuel and oxidant in the cells, thus a current is flowing through a discharge resistor (not shown) attached across the output terminals of the stack, or dissipated through internal resistance of the stack. As the stack discharges and the hydrogen is electrochemically consumed, the hydrogen pressure (dashed line) decreases. Once the hydrogen pressure reaches a certain level decided by the FPR setting (the slightly sloping plateau marked A, the plateau depends on the spring setting in the FPR), the FPR opens to allow fresh hydrogen to enter from the fuel reservoir 190 (shown in FIG. 1a). The FPR maintains the anode pressure slightly above the cathode pressure until the hydrogen in the fuel reservoir 190 has been consumed. At point B, the hydrogen pressure reaches atmospheric pressure. After the hydrogen in the anode side has been consumed at pressures above ambient, further hydrogen consumption by reaction drives the pressure at the anode inlet more and more negative until an equilibrium pressure point is reached (point C). Once the system has reached this maximum negative pressure, the anode inlet pressure starts to increase back to atmospheric conditions due mainly to crossover from the cathode to the anode side (the crossover fluid being mainly nitrogen). Regarding the stack voltage, after a certain time, the reactants are depleted to cause the stack voltage (dotted line) to rapidly decay down to zero as the cells are discharged across the discharge resistor. Atmospheric pressure is indicated with a dash/double-dotted line marked D. In one experiment, for example, it took about 25 minutes for the hydrogen pressure to reach approximate atmospheric pressure, although this is not shown in FIG. 2a. The extent to which the anode inlet pressure drops below atmospheric pressure is dictated by the size of the fuel reservoir 190.

Figure 2B:
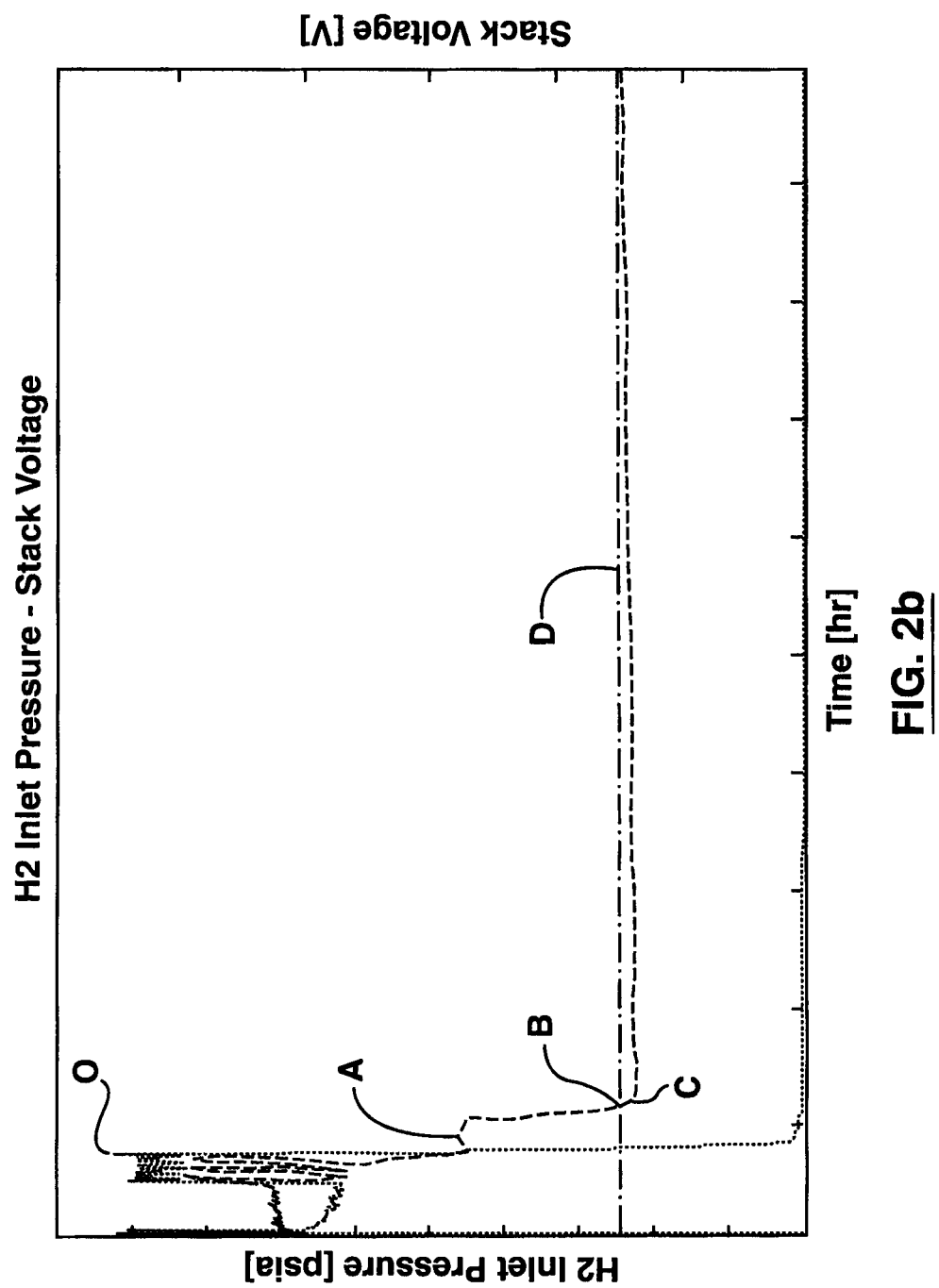
FIG. 2b is a diagram illustrating the shut-down behavior of an electrochemical cell system showing a stack leak is present.

FIG. 2b shows a diagram of the behavior of a cell stack with detectable leaks. The same reference letters have been used as for FIG. 2a to describe corresponding features. The voltage behavior is similar to that shown in FIG. 2a, but the hydrogen pressure reaches approximate atmospheric pressure in a much shorter time, in an experiment it took about 5 minutes. Atmospheric pressure is indicated with a dash/double-dotted line.

Thus, cell stack leaks may be detected by detecting how quickly or slowly the hydrogen pressure in the anode inlet decays down to approximately atmospheric pressure after a controlled shutdown or an e-stop of the electrochemical cell system. Leaks can be detected by comparing signal values versus a stored "standard" value for the cell stack. Leaks can be detected vis-á-vis stored values either by (a) comparing the signal pressure at a pre-set time period after shut-down with a stored value, or (b) comparing a recorded time for how long it takes for the signal pressure to fall to a pre-set pressure point with a pre-set threshold time period from shutdown. The pre-set pressure point can be, for example, the equilibrium pressure point for the system. Because of this, it should be appreciated that the control unit 200 can receive the signal indicative of the reactant fluid pressure from the pressure transmitter 170/180 on a substantially continuous basis, or as a single reading taken, for example, after 5 minutes.

The control unit 200 compares the received signal value(s) with stored value(s) and generates a leak signal if the rate of decay of the electrochemical cell system indicates a leak. The leak indication signal may be a computer signal, a visual or audio signal or a combination, for example a "check engine" light.

Additionally, the actual leak rate may be determined from the slope of the pressure decay. The control unit 200 would, for instance, compare stored actual pressure decay values obtained during a shutdown with stored pre-set values indicative of a no-leak cell stack shutdown pressure decay and with stored pre-set values indicative of a leaky cell stack shutdown pressure decay.

The sensed pressure is compared to either the stored pressure at a pre-set time period after initiating shut-down, which is the ambient pressure obtained by the control unit 200, or, if the FPR has failed, a stored value indicative of a maximum permissible anode inlet pressure for the particular fuel cell stack type and construction. Thus, if the sensed fuel pressure (after the pre-set time period from shut-down) is lower than the stored value, there is a system leak, if the sensed fuel pressure is greater than the stored value, there is no (measurable) leak and if the pressure is greater than the stored pre-set value (maximum "allowable" pressure), the FPR is likely malfunctioning.

A method of operating an electrochemical cell system according to the present invention has the steps of: (a) sensing a reactant fluid pressure in a reactant inlet to an electrochemical cell stack; (b) comparing the sensed reactant fluid pressure at a pre-set time period from initiating shut-down of the electrochemical cell system with a pre-set stored pressure; and (c) indicating a leak if the sensed reactant fluid pressure is lower than the stored pressure.

Another method of operating an electrochemical cell system according to the present invention has the steps of: (a) sensing a reactant fluid pressure in a reactant inlet to an electrochemical cell stack; (b) monitoring the reactant fluid pressure and recording the time for the reactant fluid pressure to reach a pre-set pressure point; (c) comparing the recorded time for the reactant fluid pressure with a pre-set threshold time; and (d) indicating a leak if the recorded time is less than the pre-set time threshold.

It should be appreciated that the spirit of the present invention is concerned with providing leak detection and indication for an electrochemical cell system. The type and internal structure of the electrochemical cell stack does not affect the design of the present invention. In other words, the present invention is applicable to various types of fuel cells, electrolyzers or other electrochemical cell systems. The position, number, size and pattern of the electrochemical cell stacks and peripheral devices are not necessarily identical as disclosed herein.

It is anticipated that those having ordinary skill in this art can make various modification to the embodiment disclosed herein after learning the teaching of the present invention. However, these modifications should be considered to fall under the protection scope of the invention as defined in the following claims.

The invention claimed is:

1. An electrochemical cell system comprising:
 a) at least one electrochemical cell stack, each stack having a reactant fluid inlet;
 b) a pressure transmitter arranged in the reactant fluid inlet of each stack; and
 c) a control unit for regulating the electrochemical cell system, the control unit receiving a signal value from the pressure transmitter indicative of the reactant fluid pressure and comparing the signal value with a stored value, wherein the signal value and the stored value correspond with pressure in the at least one electrochemical cell stack at a pre-set time period after initiating shut-down of the electrochemical cell system.

2. The electrochemical cell system of claim 1, wherein the control unit generates a leak indication signal if the signal value is lower than the stored value.

3. The electrochemical cell system as recited in claim 2, wherein the control unit generates a maximum pressure signal when the control unit compares the received signal value with a stored maximum value indicative of a maximum permissible reactant inlet pressure and the received signal value is higher than the stored maximum value.

4. The electrochemical cell system of claim 3, wherein the reactant fluid is fuel fluid and the reactant fluid inlet is an anode inlet of the at least one electrochemical cell stack.

5. The electrochemical cell system of claim 4, wherein the electrochemical cell stack is a proton exchange membrane fuel cell stack.

6. An electrochemical cell system comprising:
 a) at least one electrochemical cell stack, each stack having a reactant fluid inlet;
 b) a pressure transmitter arranged in the reactant fluid inlet of each stack; and
 c) a control unit for regulating the electrochemical cell system, the control unit:
  i) receiving a plurality of signal values from the pressure transmitter indicative of the reactant fluid pressure;
  ii) recording a time for the signal values to reach a pre-set pressure point;
  iii) comparing the time to a pre-set threshold time; and
  iv) generating a leak indication signal if the time is less than the pre-set threshold time.

7. The electrochemical cell system of claim 6, wherein the pre-set pressure point corresponds with an equilibrium pressure point for the at least one electrochemical cell stack.

8. The electrochemical cell system of claim 7, wherein the reactant fluid is fuel fluid and the reactant fluid inlet is an anode inlet of the at least one electrochemical cell stack.

9. The electrochemical cell system of claim 8, wherein the electrochemical cell stack is a proton exchange membrane fuel cell stack.

10. A method of operating an electrochemical cell system, the electrochemical cell system having at least one electrochemical cell stack and each stack having a reactant fluid inlet, the method comprising:
 a) sensing a reactant fluid pressure in the reactant fluid inlet;
 b) recording the reactant fluid pressure at a pre-set time period after initiating shut-down of the electrochemical cell system;
 c) comparing the reactant fluid pressure at the pre-set time period with a stored pressure corresponding with the pre-set time period after initiating shut-down of the electrochemical cell system; and d) indicating a leak if the reactant fluid pressure is lower than the stored pressure.

11. The method of claim 10, wherein the method further comprises the steps of:
   a) comparing the reactant fluid pressure with a stored maximum pressure; and
   b) indicating a pressure alarm signal if the reactant fluid pressure is higher than the stored maximum pressure.

12. A method of operating an electrochemical cell system, the electrochemical cell system having at least one electrochemical cell stack and each stack having a reactant fluid inlet, the method comprising:
   a) sensing a reactant fluid pressure in the reactant fluid inlet;
   b) monitoring the reactant fluid pressure while initiating shut-down of the electrochemical cell system;
   c) recording a time for the reactant fluid pressure to reach a pre-set pressure point;
   d) comparing the time with a pre-set threshold time period; and
   e) indicating a leak if the time is less than a pre-set threshold time period.

* * * * *